(12) United States Patent
Lu et al.

(10) Patent No.: US 9,065,823 B2
(45) Date of Patent: Jun. 23, 2015

(54) SYSTEM AND METHOD FOR USING A PORTABLE SECURITY DEVICE TO CRYPTOGRAHICALLY SIGN A DOCUMENT IN RESPONSE TO SIGNATURE REQUESTS FROM A RELYING PARTY TO A DIGITAL SIGNATURE SERVICE

(75) Inventors: HongQian Karen Lu, Austin, TX (US); Kapil Sachdeva, Leander, TX (US)

(73) Assignee: GEMALTO SA, Meudon (FR)

( * ) Notice: Subject to any disclaimer, the term of this patent is extended or adjusted under 35 U.S.C. 154(b) by 0 days.

(21) Appl. No.: 13/583,578

(22) PCT Filed: Mar. 8, 2011

(86) PCT No.: PCT/EP2011/053431
§ 371 (c)(1),
(2), (4) Date: Sep. 7, 2012

(87) PCT Pub. No.: WO2011/110539
PCT Pub. Date: Sep. 15, 2011

(65) Prior Publication Data
US 2013/0046991 A1    Feb. 21, 2013

(51) Int. Cl.
*G06F 21/00* (2013.01)
*H04L 29/06* (2006.01)
*H04L 9/32* (2006.01)

(52) U.S. Cl.
CPC .......... *H04L 63/0853* (2013.01); *H04L 9/3234* (2013.01); *H04L 9/3247* (2013.01); *H04L 63/126* (2013.01); *H04L 2209/80* (2013.01)

(58) Field of Classification Search
None
See application file for complete search history.

(56) References Cited

U.S. PATENT DOCUMENTS

| 6,408,388 | B1* | 6/2002 | Fischer | 713/176 |
| 6,856,970 | B1* | 2/2005 | Campbell et al. | 705/35 |
| 2003/0177353 | A1* | 9/2003 | Hiltgen | 713/161 |
| 2012/0191977 | A1* | 7/2012 | Foster et al. | 713/170 |
| 2012/0323786 | A1* | 12/2012 | Kirsch | 705/44 |

FOREIGN PATENT DOCUMENTS

WO    WO2006042992 A2    4/2006

OTHER PUBLICATIONS

"Mobile Commerce (M-COMM); Mobile Signatures; Business and Functional Requirements; ETSI TR 102 203", ETSI Standards, LIS, Sophia Antipolis Cedex, France, vol. M-COMM, No. V1.1.1, May 1, 2003, XP014037230, ISSN: 0000-0001.
M. Oostdijk, M. Wegdam: "Mobile PKI", Dec. 8, 2009, XP002635656, Retrieved from the Internet: URL:http://www.terena.org/news/community/download.php?news_id=2528 [retrieved on May 9, 2011].

(Continued)

*Primary Examiner* — Jeffery Williams
(74) *Attorney, Agent, or Firm* — The Jansson Firm; Pehr B. Jansson

(57) ABSTRACT

(EN)A system, method and computer-readable storage medium with instructions for operating a digital signature server and a portable security device to cooperate to provide digital signature services using a private key stored on the portable security device by delegating to a user's smart card the actual task of digitally signing documents. Other systems and methods are disclosed.

10 Claims, 9 Drawing Sheets

(56) References Cited

OTHER PUBLICATIONS

Evgenia Pisko ED—Anonymous: "Mobile Electronic Signatures: Progression from Mobile Service to Mobile Application Unit", Management of Mobile Business, 2007. ICMB 2007. International Conferen CE on the , IEEE, PI, Jul. 1, 2007, pp. 6-6, XP031119381, ISBN: 978-0-7695-2803-8.

PCT/EP2011/053431 International Search Report, May 9, 2011, European Patent Office. P.B. 5818 Patentlaan 2 NL—2280 HV Rijswijk.
PCT/EP2011/053431 Written Opinion of the International Searching Authority, May 9, 2011, European Patent Office, D-80298 Munich.

\* cited by examiner

SYSTEM AND METHOD FOR USING A PORTABLE SECURITY DEVICE TO CRYPTOGRAHICALLY SIGN A DOCUMENT IN RESPONSE TO SIGNATURE REQUESTS FROM A RELYING PARTY TO A DIGITAL SIGNATURE SERVICE

CROSS-REFERENCE TO RELATED APPLICATIONS

This application is a Patent Cooperation Treaty application claiming priority from U.S. provisional application Ser. No. 61/311760, filed on Mar. 8, 2010, entitled "SYSTEM AND METHOD FOR USING A SMART CARD TO CRYPTOGRAPHICALLY SIGN A DOCUMENT IN RESPONSE TO SIGNATURE REQUESTS FROM A RELYING PARTY TO A DIGITAL SIGNATURE SERVICE," the teachings of which are incorporated by reference herein as if reproduced in full below.

BACKGROUND OF THE INVENTION

The present invention relates generally to cryptographic signing of electronic documents, and in particular to using a smart card to sign a document for a user in response to a request to have the document signed for the user by a network signing service.

OASIS Digital Signature Service (DSS) is an OASIS standard that describes how a digital signature service can be provided. The DSS Specification ("Digital Signature Service Core Protocols, Elements, and Bindings," version 1.0, OASIS standard, Apr. 11, 2007.) details the digital signature service core protocols, elements, and bindings. The DSS Specification says:

"This (DSS) specification describes two XML-based request/response protocols—a signing protocol and a verifying protocol. Through these protocols a client can send documents (or document hashes) to a server and receive back a signature on the documents; or send documents (or document hashes) and a signature to a server, and receive back an answer on whether the signature verifies the documents."

Different applications, i.e., different relying parties, may have different requirements for signing and verifying signatures. DSS handles this requirement through different DSS profiles, such as abstract code-signing profile, XML time-stamping profile, German signature law profile, and so on. The DSS provides a centralized service model so that applications can ask for signature services from a DSS server instead of having to deal with signature-related complexities themselves.

Digital signing is a cryptographic operation that uses the private key of a {public key, private key} pair. The private key belongs to its owner, must be securely stored, and should not be given to anyone else. In OASIS DSS, DSS manages or accesses private keys (also called signing keys), eliminating the need of distributing user keys and/or signing devices/software. The DSS model works well for signatures on an organization's behalf, such as code signing, business agreements, press release, and so on.

Using OASIS DSS, how the digital signature is created is not relevant to a relying party (RP). The OASIS DSS model works as long as the DSS server can access users' private keys. However, if the private keys are in users' smart cards, the keys are not directly accessible by the DSS server and the model breaks down Some signature requirements conflict with the DSS model of storing the private keys on a central server; for example, certain European countries require that the private key stays with the user. Furthermore, for the centralized model, the security of the digital signing depends on the strength of the user authentication. Most of the authentication systems use usernames and passwords, one of the weakest forms of authentication. If a user's username and password are compromised, the attacker can sign documents without the user's knowledge, which could result in personal or organizational damage.

For individual signatures, the DSS model of centralized key management is less attractive. Many corporations, government agencies, and others have deployed the smart card infrastructure to use smart cards to secure private information associated with an individual user to allow for logical and physical access and to store individual secure information, e.g., the private keys. Each user within the organization has a smart card with private and public key pairs stored in it.

Often, these organizations require users to digitally sign documents, such as emails, using their smart cards. In this situation, the smart card works with the host application, for example Microsoft's email software, Outlook. The host application communicates with the smart card and asks the card to perform the digital signing operation through some middleware running on the host computer. The smart card carries the user's private key. It requires user authentication before performing any operations that involve the private key. This provides a two-factor security protection (what-you-know and what-you-have), which mitigates the risk mentioned above: the private key stays with the user; a compromised pair of username and password does not lead to a forged digital signature. However, there is no standard way of using smart cards to sign documents from web applications. Furthermore, each web application or RP that requires a user to digitally sign using a smart card must know how to communicate with the card.

Thus, DSS and smart card enabled digital signature mechanisms have certain advantages and disadvantages. It would be desirable to combine the advantages while overcoming the disadvantages to provide smart-card-based digital signatures to Web applications through a mechanism similar to DSS or as an enhancement to DSS.

From the foregoing it will be apparent that there is still a need for an improved method to provide a secure mechanism under which a portable security device, e.g., a smart card, connected to a host computer and having the capability of providing cryptographic signing services may cryptographically sign electronic documents on behalf of a user.

Figure 9:
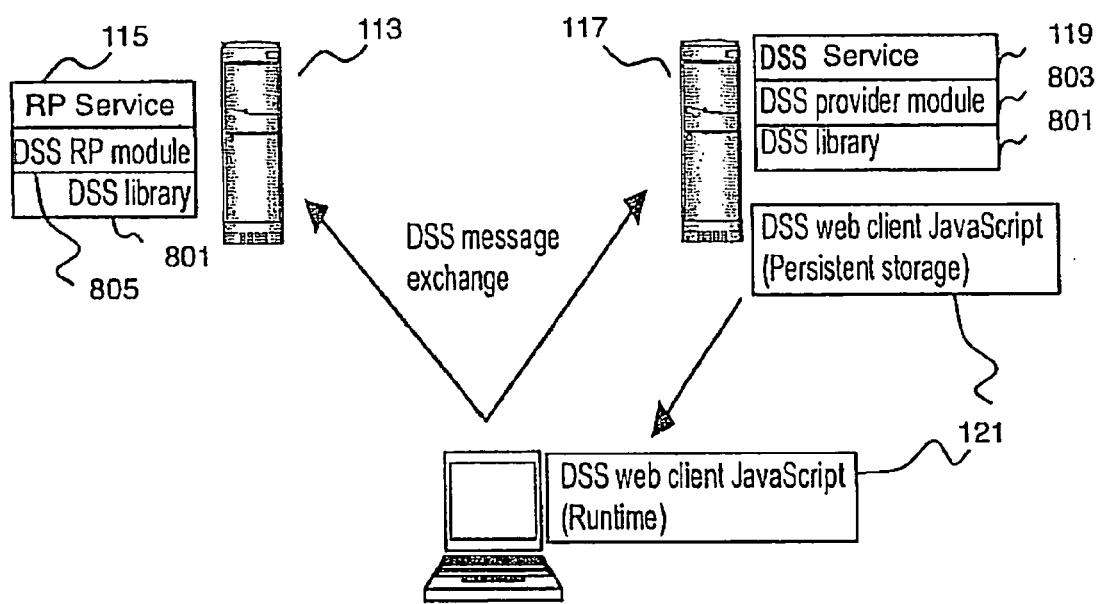

The FIG. 9 is a schematic illustration illustrating the relationships between the various software modules and computers used to provide the digital signature services of the present technology.

DETAILED DESCRIPTION OF THE INVENTION

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

In an embodiment of the invention, a technology is provided that enables the use of smart cards, or other portable security devices, to be used to digitally sign documents using private keys stored on the smart cards, for example, in conjunction with Web applications.

A method for operating a digital signature server and a portable security device to cooperate to provide digital signature services using a private key stored on the portable security device includes transmitting from a replying party a digital signature request to the digital signature server via a web browser instance operating on a host computer to which the portable security device is connected and receiving, by the digital signature server, the digital signature request from a relying party via the web browser instance executing on the host computer. The method further includes, in response to receiving the digital signature request, securely transmitting data to be signed from the digital signature server to the web browser instance executing on the host computer with an indication to operate the portable security device to sign the document and forwarding the data to be signed from the web browser instance executing on the host computer to the portable security device for signature. Further, the method includes operating the portable security device to digitally sign the data using a user private key stored on the portable security device, transmitting the digital signature from the portable security device to the digital signature server via the web browser instance executing on the host computer, and transmitting the digital signature from the digital signature server to the relying party via the web browser instance executing on the host computer.

A system for implementing the above-described method (which is further described in greater detail below) includes a digital signature server having thereon a computer-readable storage medium including instructions to direct the digital signature server to perform the functionality of a digital signature server in the above-described method. The system further includes a relying party which implements the functionality of the relying party as described herein above and in greater detail below. Finally, the system includes a host computer on which a user may interact with the relying party via a web browser. A portable security device, e.g., a smart card, is connected (or may be wirelessly connected) to the host computer. The host computer, from within the web browser, executes the functionality of the host computer in the method described herein above and further described in greater detail below. The functionality of the host computer is, in part, provided by executing, for example, from within a web browser, a web client for digital signature services that may be dynamically loaded from the digital signature server.

1.0 Introduction and Functional Model

Smart cards are plastic cards with an embedded microprocessor and a secure storage. They are portable, secure, and tamper-resistant. Smart cards provide security services in many domains including telecommunication, banking, and citizen identity. There are several form factors used for smart cards including credit card shaped cards with electrical connectors to connect the smart card to a smart card reader, USB tokens with embedded smart cards, and SIM cards for use in mobile telephones. Smart cards are used herein as examples of portable security devices that may be used in implementations of the technology described herein. Other examples of portable security devices include smart memory cards, flash memory, etc. In a preferred embodiment, the portable security device has a processor, a memory for storing programs and data, and some security features to make the device relatively tamper proof. Smart cards meet these requirements.

Digital signature is one of the functions that smart cards provide. The card stores private or secret keys in its secure storage and performs cryptographic operations to generate digital signature for a given input. A smart card works with a host device, such as a personal computer (PC), a cell phone, or a banking terminal. Typically, a PC application, such as an email client, works with a smart card to sign, encrypt, or decrypt a document. The PC application and the smart card interact through some cryptographic API called middleware, which knows how to communicate with the smart card. In this scenario, the smart card provides services locally to the PC.

Figure 1:
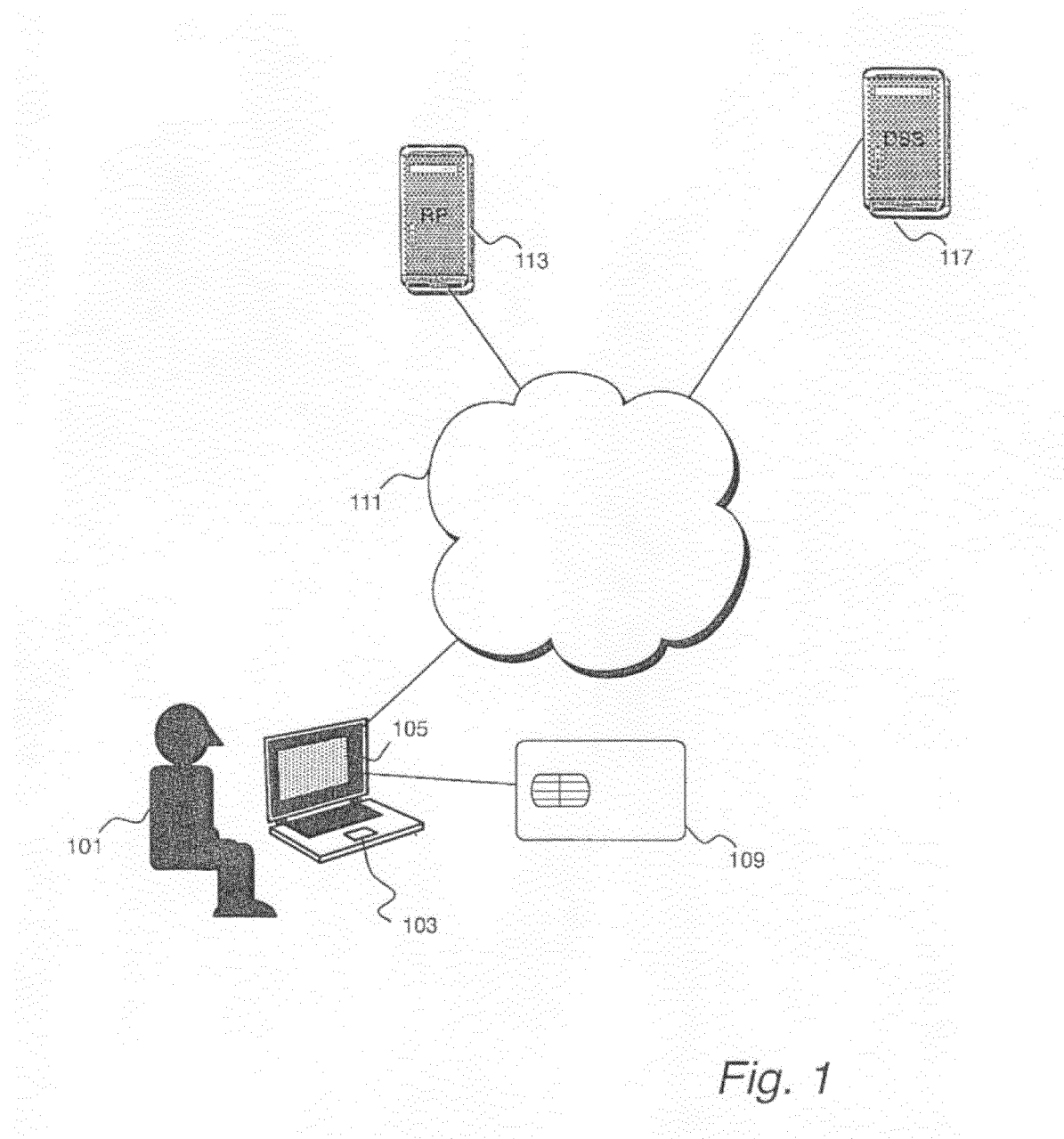
FIG. 1 is a schematic illustration of a network connecting a host computer (with a portable security device, e.g., a smart card, connected there to), a relying party (RP) and a digital signature server.

FIG. 1 is a schematic illustration of a network 111 connecting a host computer 103 (with a portable security device 109, e.g., a smart card, connected thereto), a relying party (RP) 113 and a digital signature server 117. The host computer 103 is operated by a user 101 who interacts with the RP 113 via a web browser window 105 of a web browser.

Figure 2:
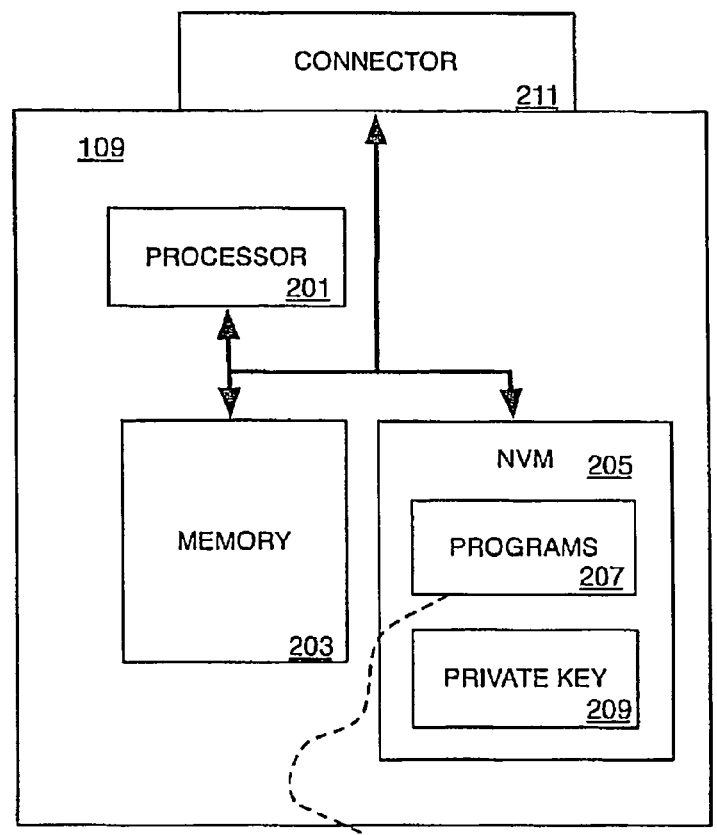
FIG. 2 is a schematic illustration of a portable security device.
Figure 2:
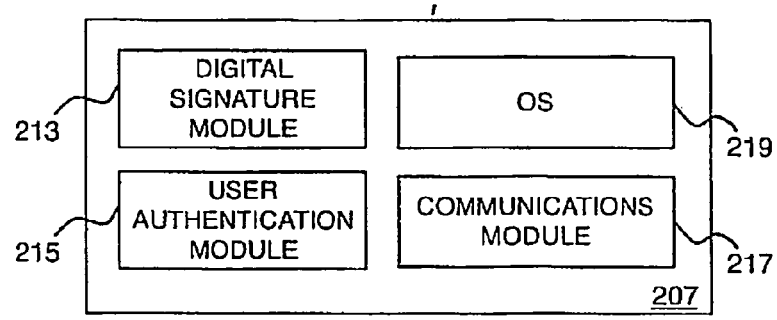

FIG. 2 is a schematic illustration of a portable security device 109. The portable security device 109 may include a processor 201 connected via a bus to a memory 203 and a non-volatile memory (NVM) 205. The NVM 205 may include computer programs 207. These programs 207 include operating system programs as well as application programs loaded on to the portable security device 109. The NVM 205 may also contain private data, such as a private key 209. The processor 201 may be further connected to connectors 211 by which the portable security device 109 may be connected to a host computer 103.

The portable security device 109 programs 207 may include a digital signature module 213, a user authentication module 215, a communications module 217, and operating system OS 219.

Thus, the portable security device 109 may receive a document via the connector 211. The processor 201, by executing instructions of the digital signature module 213, may digitally sign the document using the private key 209. Using functionality provided through the communications module 217, the processor 201 may receive and transmit communications with the host computer 103 and via the host computer 103 communications module 217.

Figure 3:
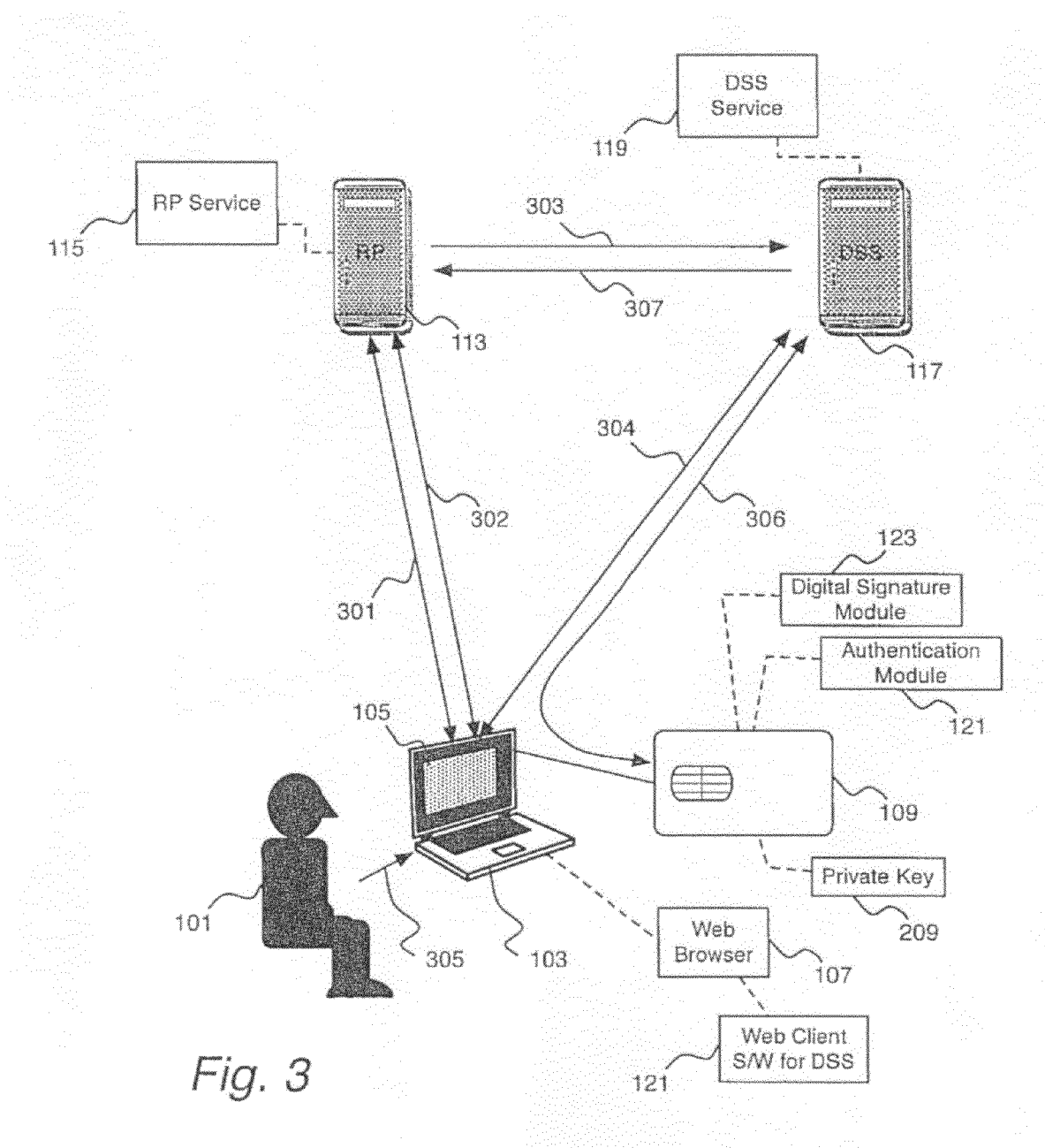
FIG. 3 is a schematic illustration of a functional centralized signature service offered to relying parties in which a smart card may be used in conjunction with a digital signature server to provide digital signatures on documents, or other data, presented from a relying party for signature on behalf of a user.

FIG. 3 is a schematic illustration of a functional centralized signature service offered to relying parties in which a smart card 109 may be used in conjunction with a digital signature server 117 to provide digital signatures on documents, or other data, presented from a relying party 113 for signature on behalf of a user 101.

The following defines the context of the operation presented in FIG. 3:

1. The Digital Signature Service (DSS) 117 operates in a trusted association based on an established trust framework.

2. The DSS server 117 provides signature services for relying parties 113, which are within the same circle of trust as the DSS server 117.

3. The end user's 101 public key and corresponding private key 209 are stored in the end user's 101 smart card 109 or other local devices that the user has control over.

4. The smart card 109 has capability to perform digital signatures.

5. The private key 209 never leaves the smart card 109.

6. The relying party 113 may not have means to access user's smart card 109.

The following are the steps by which digital signature services are provided by the smart card 109 via a request from the relying party 113 to the digital signature server 117:

1. An end user 101 interacts with a relying party (RP) 113, step 301. The relying party executes a RP service 115, i.e., some form of web service, on the relying party server 113. The end user 101 interacts with that web service 115 using a web browser 107. More specifically, the end user operates a web browser 107, which displays a web browser window 105 corresponding to a web browser instance of the web browser 107. The web browser instance 107 communicates with the RP service 115 executing on the RP server 113.

2. RP 113 asks the user to sign a document or other data, step 302. I.e., the RP service 115 executing on the RP 113 presents the user 101 via the web browser window 105 the option to have the digital signature service 117 obtain a signature on behalf of the user 101.

3. Once the user 101 agrees, RP 113 requests the signature service from the DSS server 117, step 303.

4. The DSS server 117 asks the user 101 to enter the smart card PIN, step 304.

5. User enters the PIN, 305.

6. Once the smart card 109 verifies the PIN, e.g., using its authentication module 121, the DSS server 117 works with the smart card 109 to have the smart card 109 sign the document using the private key 209 inside the smart card 109, step 306.

7. The DSS server 117 returns the signed document back to RP 113, step 307.

2.0 Protocol 2.1 Prior Art Protocol

Figure 4:
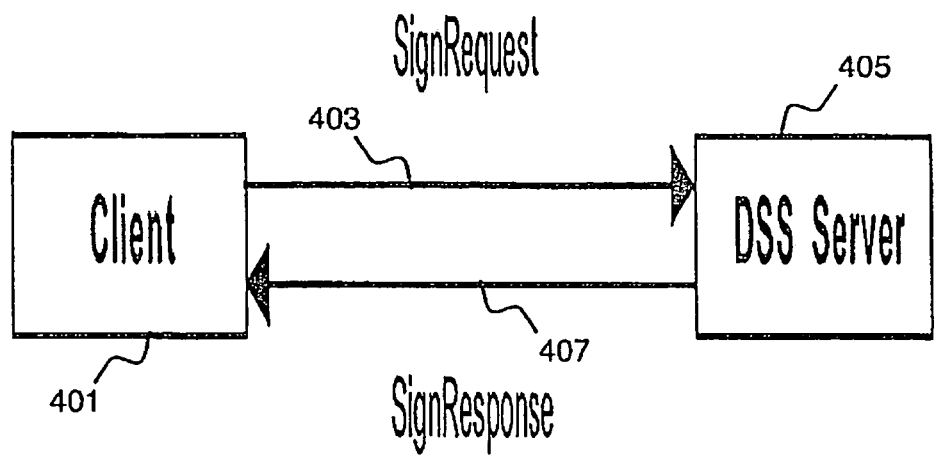
FIG. 4 is a schematic illustrating the SignRequest and SignResponse in a prior art standard OASIS DSS signing protocol.

FIG. 4 is a schematic illustrating the SignRequest and SignResponse in a prior art standard OASIS DSS signing protocol. The OASIS DSS signing protocol consists of two parts: a signing request (SignRequest) 401 sent from a client 403, e.g., a relying party service executing on a relying party server, to the DSS server 405; and a signing response (SignResponse) 407 sent from the DSS server 405 back to the client 401. The SignRequest contains the document to be signed and the SignResponse carries the signature, if the signing is successful.

The DSS messages (SignRequest, SignResponse) must be transported by some standard communication protocols. This mapping from DSS messages to a communication protocol is called transport binding. The DSS specification describes several bindings. These bindings assume direct communication protocol level connection between the client and the server. This works fine if the DSS server can sign the document without the user's help. However, when the private key is stored inside the smart card, the DSS server must interact with the user and the smart card in order to get the document signed. This means that the DSS server must be able to get back to the browser, with which its client (the relying party) interacts with the user. (See FIG. 4) As such, the DSS core bindings cannot be used directly to provide transports for signature requests and signatures for the mechanism described herein to use a user's smart card to sign documents via a digital signature server. Therefore, alternative bindings are introduced herein below.

2.2 Web Browser Profile

The OASIS DSS uses a centralized key management model so that signing keys do not need to be distributed to individuals. Access control mechanisms enable DSS to sign documents using the right keys. In order to allow individual users to sign documents using private keys stored in smart cards or other secure storage in their possession, a new DSS profile is described herein below, called Web Browser Profile, which is described in greater detail in Section 3.0 herein below.

2.3 Transport Bindings

The transport bindings for the Web Browser Profile are derived from two bindings defined in SAML 2.0 Bindings ("Bindings for the OASIS Security Assertion Markup Language (SAML) v2.0", OASIS standard, Mar. 15, 2005.): HTTP POST binding and artifact binding. These bindings allow requests and responses to go through a user agent, e.g., a web browser operated by a user. Using similar bindings to transport DSS messages provides opportunities for the DSS server to interact with the user's browser. These new bindings are described in greater detail herein below.

2.4 Workflow

Figure 5:
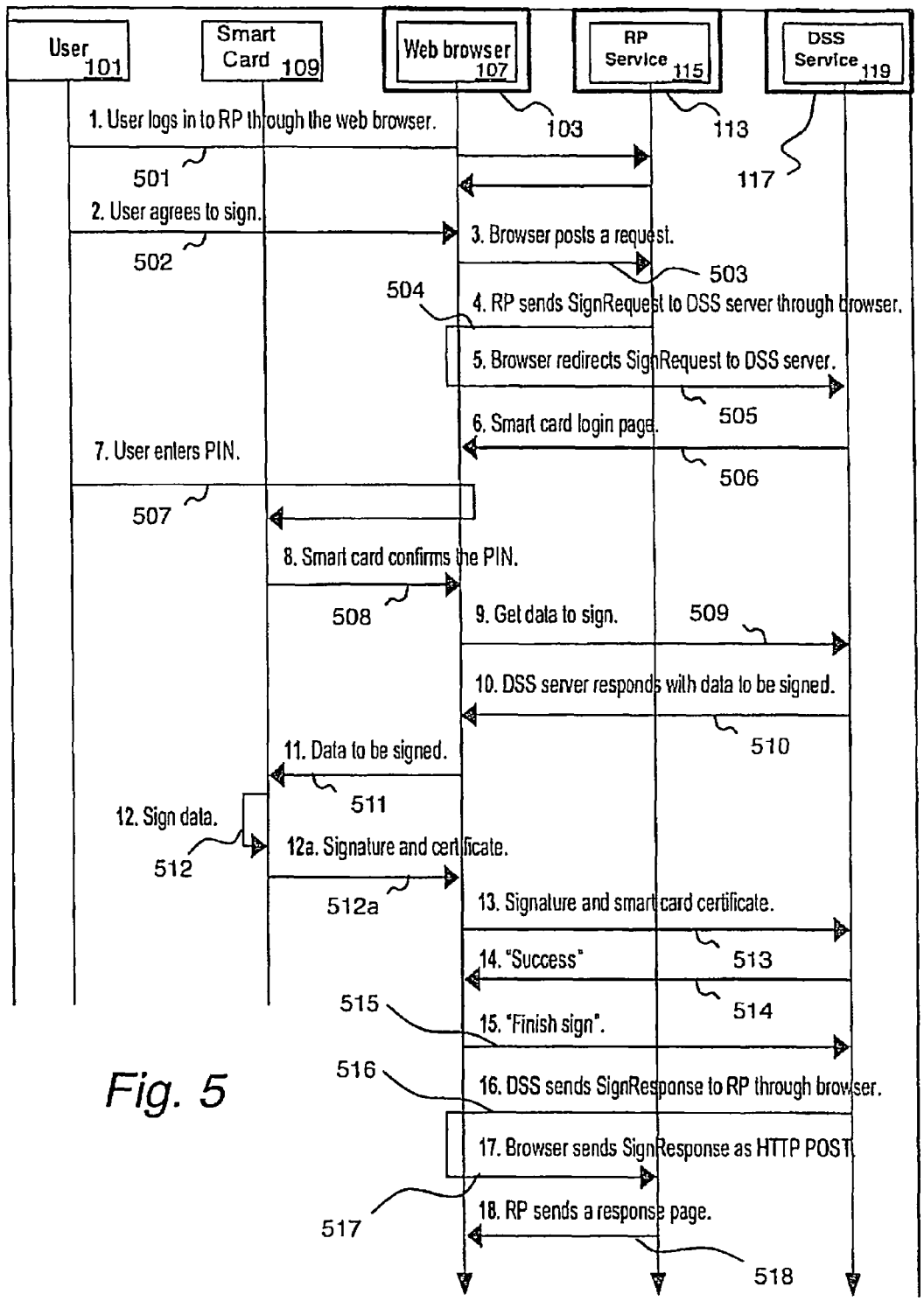
FIG. 5 illustrates an example to illustrate the workflow of a relying party using DSS to have a user to sign a document using the user's smart card.

FIG. 5 illustrates an example to illustrate the workflow of a relying party 113 using DSS services on a DSS server 117 to have a user 101 to sign a document using the user's smart card 109. The example uses the HTTP POST binding for both the DSS request and response. Other bindings described in section 3.2.3 Transport Bindings below (and elsewhere herein) can easily be adapted to this workflow which is merely an example embodiment.

Herein terminology such as "relying party 113 performs action x" or "DSS service 119 performs action y." That terminology is consistent with the manner in which computer scientists refer to the operation of pieces of computer equipment executing pieces of computer software. Of course, when it is stated that a piece of software performs an action, what is intended is that the software contains the instructions that cause the corresponding hardware to perform that action, and, conversely, when it is stated that a piece of hardware performs an action, it is meant that the hardware performs the action as directed by the corresponding software.

Example workflow:

1. The user 101 logs into the relying party web service https://www.rp.com/115 and interacts with that web site through the browser 107, e.g. via browser window 105, step 501.

2. The user 101 agrees to sign a document presented by the relying party web service 115 by clicking a "sign" button in the browser window 105, step 502.

3. The browser 107 sends a post request (step 503): POST https://www.rp.com/sign HTTP/1.1

4. The RP 115 responds with a POST redirect to DSS service 119 executing on DSS server 117 via a hidden form (step 504):

```
HTTP/1.1 200 OK
<body onload="document.forms[0].submit( )">
<form action="https://www.dss-server.com/signature" method="post">
<div>
<input type="hidden" name="SignRequest" value="PD94bWwgdmVyc2lvbj0iM...
```

5. The browser 107 sends the POST request with the SignRequest (step 505):
POST https://www.dss-server.com/signature HTTP/1.1
SignRequest=PD94bWwgdmVyc2lv . . .

6. The DSS service 119 responds with a smart card login page, step 506.

7. The user 101 enters the PIN to the smart card 109 through the browser 107 or an external device, step 507.

8. Smart card 109 confirms the PIN, step 508. Note: if the PIN is in correct, an error condition is detected and after a certain number of tries, the smart card 109 shuts down and the balance of the procedure would not be executed. Appropriate error messages would be transmitted back to the DSS Service and the RP Service. The incorrect-PIN scenario is not illustrated.

9. The browser 107 sends an HTTP get request to DSS service 119 (step 509):
GET https://www.dss-server.com/signature/get_dataToSign HTTP/1.1

10. DSS service 119 responds (step 510):
HTTP/1.1 200 OK
{"dataToSign":"315d301806092a8648 . . .

11. The web client 121 executing in the browser 107 sends the data to the smart card 109 for the smart card 109 to sign, step 511.

12. Smart card 109 signs the data and returns the signature and certificate, step 512.

13. The browser 107 sends the signature and smart card certificate to DSS service 119 (step 513):
POST https://www.dss-server.com/signature/sign HTTP/1.1
derCert=308204623082034AA0030201 . . . &signature=69050F320B38 . . .

14. DSS service 119 responds to the browser 107 with a success message (Step 514): HTTP/1.1 200 OK
{"success":true}

15. The browser 107 sends "finish sign" message (Step 515) to the DSS 119:
POST https://www.dss-server.com/signature/finish_sign 16. DSS service 119 sends back a SignResponse via POST redirect (Step 516) to the browser 107:

```
<body onload="document.forms[0].submit( )">
<form action="https://www.rp.com/signResponse" method="post">
<input type="hidden" name="SignResponse" value="PD94bWwgdmVyc2lv...
```

17. The browser 107 sends the SignResponse to the RP (Step 517):
POST https://www.rp.com/signResponse SignResponse=PD94bWwgdmVyc2l . . .

18. RP service 115 sends back a page to the user's browser 107, step 518.

3.0 Web Browser Profile 3.1 Overview

To allow a user to use a smart card to sign documents by selecting a certificate and corresponding private key, a DSS profile called Web Browser Profile is defined herein. The web browser profile is based on the OASIS DSS Core specification ("Digital Signature Service Core Protocols, Elements, and Bindings," version 1.0, OASIS standard, Apr. 11, 2007). It introduces a new input, <Signature> element, in the <SignRequest> and further makes use of several optional elements in the Core specification. The profile also specifies new DSS bindings for transporting DSS request and response messages through the web browser.

3.2 Profile of Signing Protocol

The Web Browser Profile allows requesting standard forms of digital signatures, including XML signatures ("XML Signature Syntax and Processing (Second Edition)," W3C Recommendation, Jun. 10, 2008), CMS signatures (R. Housley, "Cryptographic Message Syntax (CMS)," IETF RFC 3852) and PGP signatures (J. Callas, et al., "OpenPGP Message Format," IETF RFC 2440). The specific requested form is identified using the <SignatureType> identifier.

3.2.1 Element <SignRequest>

3.2.1.1 Optional Inputs Defined in the Core

None of the optional inputs defined in the core are prohibited from the Web Browser Profile. The optional input <ClaimedIdentity> is required in the Web Browser Profile.

3.2.1.2 Required Input <Signature>

The relying party who is making the request must digitally sign the request using the XML signature ("XML Signature Syntax and Processing (Second Edition)," W3C Recommendation, Jun. 10, 2008.). [Note: This may be changed to use the <SupportingInfo> child element of <ClaimedIdentity>.] The <ds:Signature> element must contain the following children elements:

<ds:SignedInfo> includes signing information, such as canonicalization method, signature method, transforms, digest method, and digest value.

<ds:SignatureValue> contains the value of the signature.

<ds:KeyInfo> contains information about the signing key, for example, the x.509 certificate corresponding to the signing key.

3.2.1.3 Required Optional Input <ClaimedIdentity>

The <ClaimedIdentity> is an optional input specified in the DSS Core specification. It is a required element in the Web Browser Profile. The <ClaimedIdentity> element presents the relying party who is making the request. The server uses this to determine if the requester is in its circle of trust by checking relying party's metadata. The <ClaimedIdentity> contains the name of the requester using a saml:NameIdentifierType. The following is an example:

```
<dss:ClaimedIdentity>
    <saml1:NameIdentifier
        xmlns:saml1="urn:oasis:names:tc:SAML:1.0:assertion"
        Format="urn:oasis:names:tc:SAML:1.1:nameid-
            format:unspecified">"Name"
    </saml1:NameIdentifier>
</dss:ClaimedIdentity>
```

The DSS server must authenticate the claimed identity before relying on the "Name". The authentication can be achieved using the required input <Signature>, the "Name", and the RP's metadata accessible by the DSS server. The metadata must contain the "Name" as it is in the <ClaimedIdentity> and the RP's public key.

3.2.2 Element <SignResponse>

For the <SignResponse>, the Web Browser Profile defines a new optional output, <ClaimedIdentity> and mandates the <Signature> element.

3.2.2.1 Optional Outputs Defined in the Core

None of the optional outputs already defined in the core are prohibited in the Web Browser Profile. The optional output <SignatureObject> is required in cases of success.

3.2.2.2 Required Output <Signature>

The DSS server must sign the <SignResponse> in the form of <ds:Signature> to prove the authenticity of the message. The <ds:Signature> element must contain the following children elements:

<ds:SignedInfo> includes signing information, such as canonicalization method, signature method, transforms, digest method, and digest value.

<ds:SignatureValue> contains the value of the signature.

<ds:KeyInfo> contains information about the signing key, for example, the x.509 certificate corresponding to the signing key.

3.2.2.3 Optional Output <ClaimedIdentity>

The optional output of the Web Browser Profile includes the <ClaimedIdentity> element that specifies the DSS server. It has the same format as the <ClaimedIdentity> in the optional input. The <ClaimedIdentity> is required in the Web Browser Profile.

3.2.3 Transport Bindings

This profile cannot use DSS core transport bindings defined in the DSS Core specification because the user browser must be involved in the binding so that user can select the certificate for signing. The core bindings are for direct communication between the sign requester and the DSS server.

In order for RP and the DSS server to use the same web browser to interact with the user during the DSS process, this profile defines new DSS transport bindings, which are derived from two of the bindings defined in SAML 2.0 Bindings, HTTP POST binding and artifact binding ("Bindings for the OASIS Security Assertion Markup Language (SAML) v2.0", OASIS standard, Mar. 15, 2005.). These bindings allow request and response messages to go through an HTTP user agent. This not only enables the responder to interact with the user agent, but also provides opportunities for the requester and responder to interact with the same user agent. Therefore, this profile uses these two bindings so that the user can be involved in the DSS process through the web browser.

The DSS request and response can use the same binding or different bindings, depending on the usage environment or application requirements. The advantage of the artifact binding comparing with the HTTP POST binding is better security because the actual DSS protocol message does not go through the web browser.

With the two transport bindings, there are four possible combinations for transporting DSS requests and responses:

1. HTTP POST binding for both the request and response;
2. Artifact binding for both the request and response;
3. HTTP POST binding for the request, and artifact binding for the response;
4. Artifact binding for the request and HTTP POST binding for the response.

The following two sections illustrate the first two bindings. The last two bindings are self-explanatory based on the first two.

3.2.3.1 HTTP POST Binding

In one alternative the Web Browser Profile uses the HTTP POST binding for both the DSS request and response. With this binding, the DSS request/response exchange is accomplished through two HTTP POST redirects.

Figure 6:
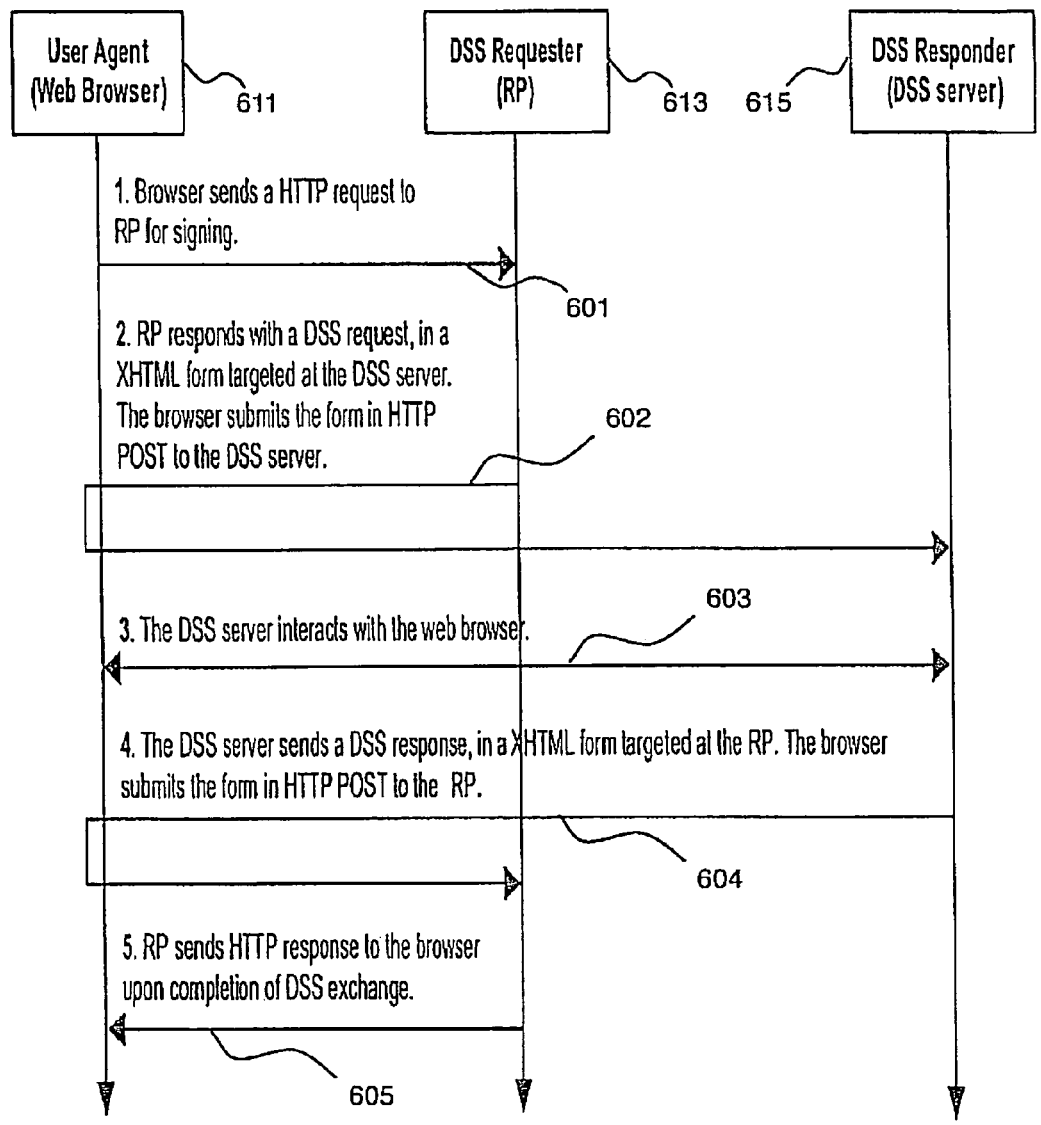
FIG. 6 is a timing-sequence diagram illustrating the HTTP Post binding for DSS request and response as used by the technology presented herein between a user agent, e.g., the web browser, a DSS requester, e.g., a relying party, and a DSS responder 605, e.g., the DSS server.

FIG. 6 is a timing-sequence diagram illustrating the HTTP POST binding for DSS request and response as used by the technology presented herein between a user agent 611, e.g., the web browser 107, a DSS requester 613, e.g., a relying party service 115, and a DSS responder 615, e.g., the DSS service 119. The message flow is as follows:

1. Step 601: Initially, the web browser sends an HTTP request to the relying party (RP) for signing document. When processing the request, RP decides to initiate a DSS protocol exchange.

2. Step 602: The RP sends a DSS request via an HTTP response to the browser. The HTTP response is a HTTP POST redirected to the DSS server, which embeds the DSS request in an XHTML document containing a form and the content of the DSS request. The browser submits the form to the DSS server using HTTP POST.

3. Step 603: The DSS server interacts with the browser in order to generate a DSS response. For example, the DSS server interacts with the user and the user's smart card through the web browser.

4. Step 604: After creating a DSS response, the DSS server sends the DSS response via an HTTP response to the browser, which is a HTTP POST redirected to the RP. The HTTP response contains an XHTML document that includes a form and the content of the DSS response. The web browser submits the form to the RP via HTTP POST.

5. Step 605: After receiving the DSS response, the RP returns an HTTP response to the web browser.

Note that the HTTP POST binding used in the Web Browser Profile is different from the HTTP POST Transport binding defined in the DSS Core specification. The Web Browser Profile use of HTTP POST is a HTTP POST redirect, whereas in the DSS Core specification it is a direct HTTP POST exchange (R. Fielding, et al., "Hypertext Transfer Protocol—HTTP/1.1," RFC 2616).

3.2.3.2 Artifact Binding

The artifact binding transmits request, response, or both by a reference, called an artifact. The requester 613 and the responder 615 then use a synchronous binding, such as SOAP binding, to exchange the artifact for the actual protocol message using the Artifact Resolution Protocol. In an alternate embodiment, the Web Browser Profile uses the artifact binding to transport the DSS request and response.

Figure 7:
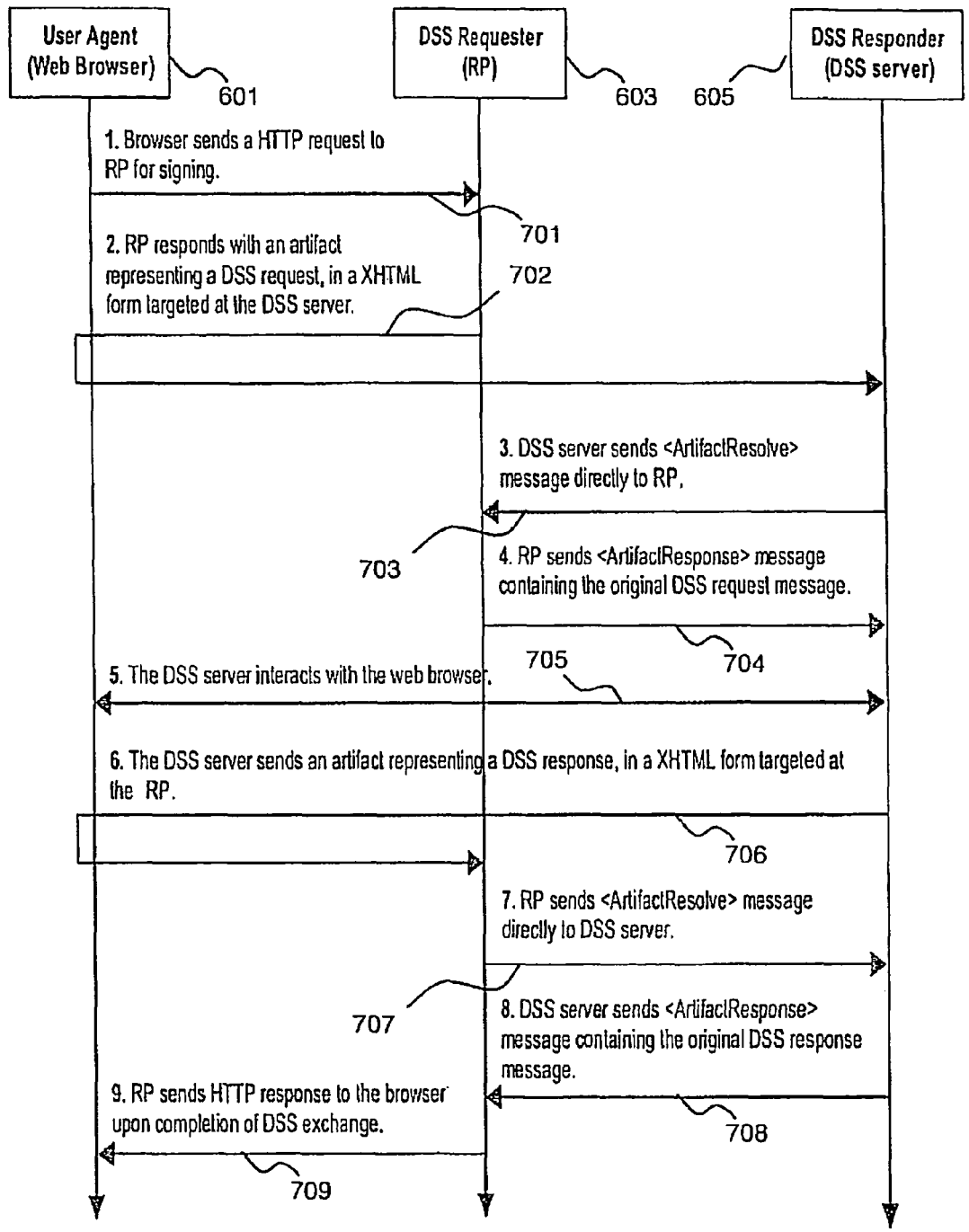
FIG. 7 is a timing-sequence diagram illustrating the artifact binding for DSS request and response as used by the technology presented herein.

FIG. 7 is a timing-sequence diagram illustrating the artifact binding for DSS request and response as used by the technology presented herein. The message flow is as follows:

1. Step 701: Initially, the web browser sends an HTTP request to the relying party (RP) for signing document. When processing the request, RP decides to initiates a DSS protocol exchange.

2. Step 702: The RP responds to the HTTP request by sending an artifact representing a DSS request using an HTTP redirect through the browser to the DSS server.

3. Step 703: The DSS server sends an <ArtifactResolve> message including the artifact directly to RP.

4. Step 704: The RP sends an <ArtifactResponse> message containing original DSS request directly to the DSS server. This completes the DSS request process.

5. Step 705: The DSS server interacts with the browser in order to generate a DSS response. For example, the DSS server interacts with the user and the user's smart card through the web browser.

6. Step 706: After creating a DSS response, the DSS server sends an artifact representing the DSS response using an HTTP redirect through the browser to the RP.

7. Step 707: The RP sends an <ArtifactResolve> message including the artifact directly to the DSS server.

8. Step 708: The DSS server sends an <ArtifactResponse> message containing the original DSS response directly to the RP. This completes the DSS response process.

9. Step 709: After receiving the DSS response, the RP returns an HTTP response to the web browser.

3.2.4 Security Bindings

In a preferred embodiment, the Web Browser Profile uses security bindings to carry all transport bindings. Accordingly, all digital signature service communications between the replying party service 115 executing on the relying party server 113, the digital signature service 119 executing on the digital signature server 117, the web browser 107 executing on the host computer 103, and the smart card 109 are secured, e.g., using the TLS (Transport Layer Security) protocol. Furthermore, direct communication between the relying party 113 and the digital signature server 117 preferably is based on mutual authentication, e.g., using TLS X.509 mutual authentication.

4.0 Software Architecture

Figure 8:
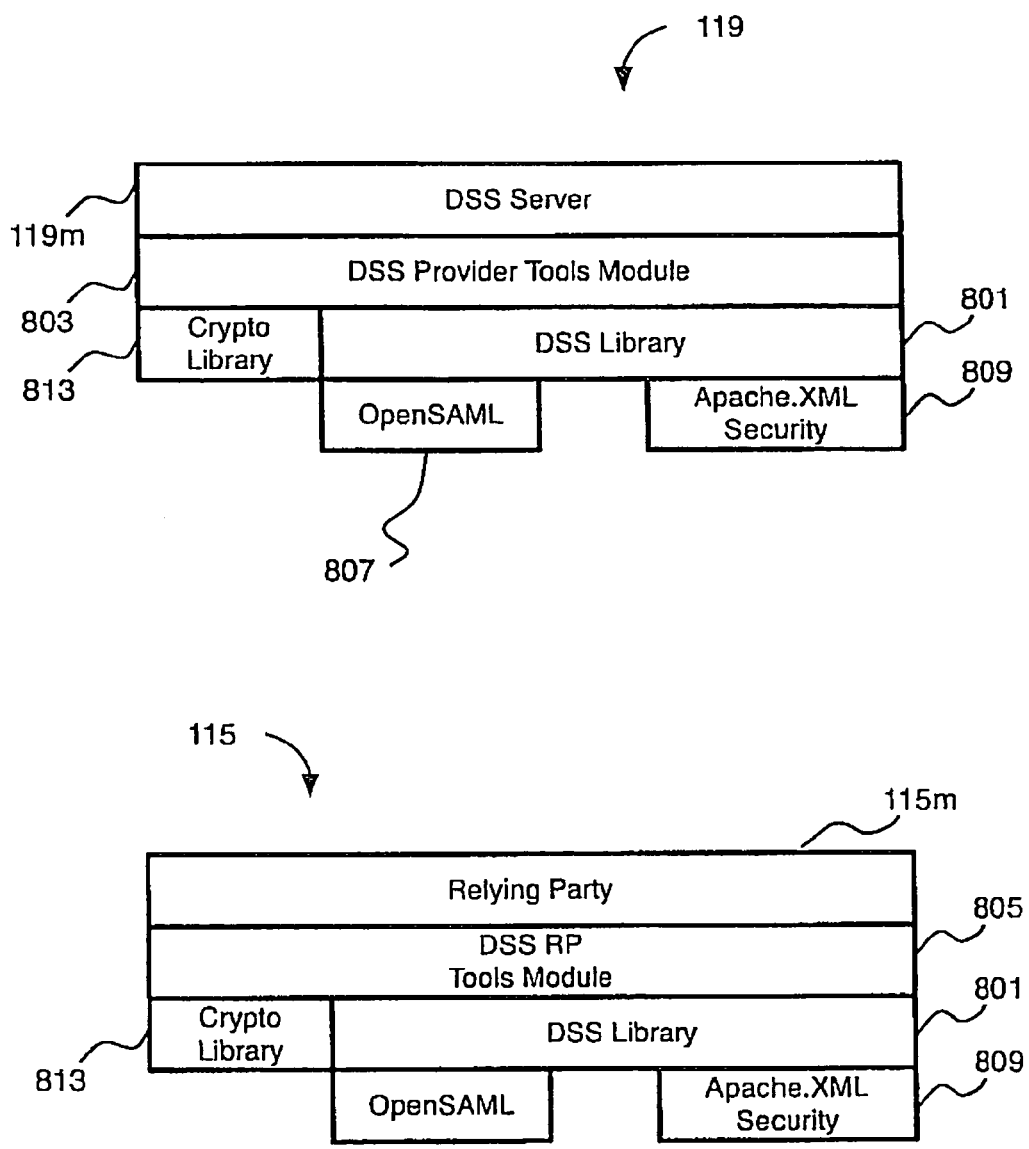
FIG. 8 is a block diagram illustrating the DSS web server side software architecture, i.e., one example of the software architecture for the DSS service 119. Open source libraries and frameworks are used as building blocks.

In a preferred embodiment, the DSS software for allowing smart card signature in conjunction with a digital signature server according to the herein described technology consists of two parts: the web server software, i.e., the DSS service 119 and the relying party service 115, and the web client software 121 executing within the web browser 107. FIG. 8 is a block diagram illustrating the web server side software architecture, i.e., one example of the software architecture for the DSS service 119 and the relying party service 115.

4.1 DSS Service 119

The DSS service 119 software includes a DSS service module 119*m*, a DSS library 801, a DSS provider tools module 803. Open source libraries and frameworks are used as building blocks.

The DSS service module 119*m* contains code for a specific implementation of a DSS service 119. That code calls upon tools provided in the DSS service provider module 803.

DSS Provider Tools Module 803

The DSS provider tools module 803 contains functionalities and interface of a DSS server 119. These tools provide mechanisms for the interactions with the web client 121 or with RP service 115 directly to enable the digital signing of documents submitted by the RP service 115.

The DSS provider module uses the DSS library 801 for DSS functionalities and a crypto library 813, e.g., the open source code BouncyCastle (http://www.bouncycastle.org/) to handle CMS signature. Implementation-wise, the DSS provider module 803 may be a Grails framework plug-in (http://www.grails.org). A DSS server 119 built using the Grails framework can use the DSS provider module 803 plug-in directly.

DSS Library 801

The DSS library 801 (OASIS-DSS in the illustrated example software stack) provides API and basic support for digital signature services. The library 801 includes:

1. Data type and object definitions;
2. Message encoding (DSS, HTTP, Base64);
3. Message decoding (DSS, HTTP, Base64);
4. Message processing;
5. Digital signing;
6. Signature verification;
7. Security rules support;
8. Metadata access.

Implementation-wise, the DSS library uses OpenSAML 807 (https://spaces.internet2.edu/display/OpenSAML/Home/) for its basic functionalities, and uses some functionality from Apache.XML security package 809 which both are open source software that may be used to support basic DSS functions. The DSS library 801 is a Java class library, which is independent of application frameworks used by the DSS server and relying parties.

4.2 Relying Party Server 115

The relying party server 115 has a similar structure to the DSS server 119. The relying party server 115 consists of a main program and related program code 115*m* implementing the functionality of the relying party server 115. The relying party main program and related program code 115*m* provides specific functionality of particular relying party services 115 implementations. The relying party services implementation calls upon tools provided in the DSS RP Tools module 805 to access DSS services.

DSS Relying Party Tools Module 805

The DSS RP Tools Module 805 provides various DSS related service API for RP web applications 115 to use. The services include metadata manager, provider security policy resolver, and requester web signature. The DSS RP Tools Module 805 uses the DSS library 801 for the basic DSS support. For example, it uses the DSS library 801 to construct DSS messages and bindings. RP web applications 811 can use the RP module 805 to access DSS services.

4.3 Web Client Module 121

The DSS web client module 121 resides on the DSS server 117. The DSS web client module 121 is dynamically downloaded to the web browser 107 when the DSS server 119 responds to a signing request from the browser 107. The DSS web client module 121 interacts with the DSS service 119 and is responsible for the following tasks to implement the client side part of the signature workflow illustrated in FIGS. 3 and 5.

In a preferred embodiment, the SConnect technology (described in U.S. Pat. No. 7,748,609, to Sachdeva, Kapil et al., and entitled "System and Method for Browser Based Access to Smart Cards") that enables a smart card to communicate with a remote web server securely. The web client module 121 provides the following functions:

1. Allow the user 101 to authenticate to the smart card 109.
2. Receive data to be signed from the DSS service 119.
3. Send the data to the smart card 109 for signature.
4. Receive the signature and smart card certificate from the smart card 109 and send these to the DSS service 119.

4.4 Summary of Example Software Architecture

In one embodiment, the digital signature service described herein for the use of smart cards to sign on behalf of a user within the framework of DSS involves three software parties:

1. DSS requester, i.e. RP service 115, that requests DSS service;
2. DSS responder, i.e. DSS service 119, that provides DSS service;
3. DSS web client, i.e. web client module 121, which from within the web browser 107 interacts with the user 101, RP service 115, the DSS service 119, and the smart card 109.

The RP service 115 can use the DSS RP module 805 to request digital signature service from the DSS service 119, and receiving and interpreting the DSS response. The DSS service 119 uses the DSS Provider module 803 to handle DSS requests and producing responses, and uses the DSS web client module 121 to interact with the user and the smart card 109. Note: the DSS web client module 121 is dynamically loaded from the DSS server 117 (where it resides in persistent storage) to the web browser 107 when the signature services are invoked. FIG. 9 is a schematic illustration illustrating these relationships.

From the foregoing it will be apparent that a technology is presented herein which provides an effective and elegant mechanism by which a user's smart card may be used to store a private key for use in digital signature services that are centralized in the manner of DSS. The mechanism provides for a relying party requesting signature services to a digital signature server which in turn relies on a user's smart card to provide the digital signature.

Although specific embodiments of the invention have been described and illustrated, the invention is not to be limited to the specific forms or arrangements of parts so described and illustrated. The invention is limited only by the claims.

We claim:

1. A method for operating a digital signature server, a host computer, and a smart card connected to the host computer, to obtain a digital signature on a data item, comprising:
    establishing a network connection between a web browser instance on the host computer and a relying party server over a computer network;
    receiving, at the digital signature server, a signature request from the relying party via the communication with a web browser instance on the host computer, wherein the request, which is transmitted from the relying party to the digital signature server over a network connection between the web browser instance and the digital signature server via the web browser instance of the host computer, requests the digital signature server to digitally sign the data item on behalf of a user of a web service of the relying party;
    in response to receiving the signature request:
        transmitting the data item to be signed from the digital signature server to the web browser instance over the network with an indication to operate the smart card to sign the data item; and
        forwarding the data item to be signed from the web browser instance executing on the host computer to the smart card for signature;
    receiving the signature at the digital signature server from the smart card via the host computer over the network connection between the web browser instance and the digital signature server; and
    upon receiving the signature at the digital signature server from the smart card via the host computer, transmitting the signature from the digital signature server to the relying party via the web browser instance over the network.

2. The method of claim 1 wherein the step of transmitting the data item to be signed from the digital signature server comprises transmitting the data to be signed together with the instructions to cause the web browser instance to obtain the signature from a smart card connected to the host computer and instructions to cause the smart card to transmit the signature back to the digital signature server.

3. The method of claim 1 or 2 wherein the step of receiving, at the digital signature server, a signature request from a relying party comprises receiving by the digital signature server the signature request in a first transport binding that enables the digital signature server to respond to the browser interacting with the relying party.

4. The method of claim 3 wherein the step of transmitting the signature from the digital signature server comprises transmitting the signature to the relying party via the web browser instance executing on the host computer using a second transport binding that causes a redirection of the response in the web browser instance to the relying party.

5. The method of claim 4 wherein the first transport binding is the same as the second transport binding.

6. The method of claim 4 wherein the first transport binding is different from the second transport binding.

7. A system for providing digital signature service using a private key comprising:
    a portable security device connected to a host computer; and
    a digital signature server connected to the host computer over a network and operable to:
        receive a digital signature request from a relying party over the network via a web browser instance executing on the host computer wherein the digital signature request is transmitted to the web browser instance from a relying party over the network, and wherein the request, which is transmitted over the network from the relying party to the digital signature server via the web browser instance of the host computer, requests the digital signature server to digitally sign the data item on behalf of a user of a web service of the relying party;
        in response to receiving the digital signature request, securely transmitting data to be signed from the digital signature server to the web browser instance executing on the host computer over the network with an indication to operate the portable security device to sign the data;
        forwarding the data to be signed from the web browser instance executing on the host computer to the portable security device for signature;
    the portable security device operable to:
        digitally sign the data using a user private key stored on the portable security device;
        transmit the digital signature from the portable security device to the digital signature server over the network via the web browser instance executing on the host computer; and
    wherein the digital signature server is further operable to:
        transmit the digital signature from the digital signature server to the relying party over the network via the web browser instance executing on the host computer.

8. The system for providing digital signature service using a private key of claim 7 wherein the portable security device is further operable to authenticate the user prior to signing the data and to only digitally sign the data in response to successful authentication of the user.

9. The system for providing digital signature service using a private key of claim 7, wherein the relying party is configured to transmit the signature request message to the digital signature server over a first transport binding protocol, wherein the digital signature server if configured to transmit the signature to the relying party over a second transport binding protocol, and wherein the first transport binding protocol is the same as the second transport binding protocol.

10. The system for providing digital signature service using a private key of claim 7, wherein the relying party is configured to transmit the signature request message to the digital signature server over a first transport binding protocol, wherein the digital signature server if configured to transmit the signature to the relying party over a second transport binding protocol, and wherein the first transport binding protocol is not the same as the second transport binding protocol.

* * * * *